Patented Nov. 28, 1933

1,937,259

UNITED STATES PATENT OFFICE 1,937,259

METHOD OF BREAKING PETROLEUM EMULSIONS

Truman B. Wayne, Houston, Tex.

No Drawing. Application May 31, 1932
Serial No. 614,615

21 Claims. (Cl. 196—4)

This invention relates to a process of resolving petroleum emulsions of the character commonly encountered in the production, handling and refining of petroleum.

The principal object of this invention is to provide an improved process and reagents for treating petroleum emulsions to separate them into their component parts of oil and water.

This application is, in part, a division of my copending application Serial No. 539,125, filed May 21, 1931.

The present process consists in subjecting a petroleum emulsion of the water-in-oil type to the action of a small proportion of a complex organic condensation product of high molecular weight, resembling somewhat the synthetic resins produced by the condensation of two or more organic bodies containing resinophore groups selected from the well known group of compounds known to undergo such reactions, e. g. polyhydric alcohols, aldehydes, aldols, ketones, aromatic hydroxy bodies, unsaturated higher aliphatic acids, cyclic carboxylic acids, primary amines, amides, and their substituted derivatives.

The new resolving agents disclosed herein are prepared in such a manner that the condensation reactions are not permitted to proceed to the point where water and/or oil insoluble resins are produced. This may be accomplished in various ways as, for example, by retarding the condensation reactions by the presence of an interfering substance, usually a hydrophilic colloid and/or a solvent which increases its miscibility in water; or through the substitution of certain groups which prevent the formation of hard, insoluble resins, and increase the solubility in water and/or impart a marked hydrotropic effect to the finished product.

While the herein described series of complex condensation products resemble very closely a modified synthetic resin or "plasticizing agent", they are likewise similar in composition to the more complex dye-stuffs, and may be either acidic or basic, depending upon the nature and proportions of the various groups introduced and may be soluble in either water or oil, depending again on the nature of the completed condensation product, and in certain instances may have a pronounced hydrotropic effect and thus possess many of the properties of a mutual solvent for water and oil.

My broad idea contemplates the use of a resolving agent having the general characteristics above described, prepared from various combinations of organic groupings produced in various ways. I attribute the effectiveness of this new type of compound to its high colloidality, coupled with its very pronounced hydrotropic effect, resulting in a very marked action at the interfaces of a water-in-oil emulsion.

While an attempt will be made to define the course of the various chemical reactions involved in the preparation of these products, and approximately state their composition, it is to be understood, however, that the invention is not dependent on any theory herein expressed as to the course of the reactions or as to the composition of the products except as defined in the appended claims.

As stated above, a composition of the desired properties may be prepared by substituting certain groups in the complex organic condensation products prepared by the reaction of organic compounds containing resinophore groups. For example, the condensation product of synthetic resin type may be modified by the introduction of one or more organic groupings selected from the group comprising alkyl, cyclo-alkyl, aralkyl, sulfonic, and carboxyl groups. In some instances, the modifying agent may be a detergent body. Specifically, the modifying agent may be an acid selected from the group comprising organic soap-forming sulfonic, carboxylic, and sulfo-carboxylic acids, or their salts, esters or amides. Further, modified fatty acids and residues from modified fatty acids may constitute modifying agents. Other specific compounds suitable for use are indicated below and it will be noted that in many instances the final complex condensation product employed as the resolving agent may contain several modifying groupings.

In addition to the features which characterize this new type of compound which are set forth above it is to be noted that many of the products are capable of undergoing saponification with alkalis. Moreover, many of the complex condensation products are very stable toward calcium and magnesium salts, and may be successfully used in relatively small proportions on petroleum emulsions which contain natural hard waters in a finely emulsified condition, and which do not readily respond to treatment with the usual commercial resolving compounds based on modified fatty acids, because of the formation of water-insoluble, oil-soluble calcium and magnesium soaps.

Organic amines and amides are employed in the preparation of the hard, infusible, synthetic resins of commerce. Their reaction products with aliphatic aldehydes and their polymerization products are especially valuable for such purposes. The polymerization and condensation reactions which these substances undergo produce final products that are hard, insoluble, and infusible substances of extremely high molecular weight. However, I have discovered that by causing these reactions to proceed under conditions which prevent the formation of hard resins, highly effective demulsifiers for petroleum emulsions may be prepared. This is accomplished by introducing groups or radicals which act as modifying agents, as previously stated.

The organic amines used in the preparation of products that are useful for my purpose may be selected from the general class known as aromatic amines, or arylamines, and includes aniline and its homologues, and the corresponding naphthylamines, etc.

The aliphatic hydrocarbons used may be selected from the various polyhydric alcohols, aldehydes, and acids of the aliphatic series which are known to undergo resinifying reactions with the arylamines. For instance, aliphatic aldehydes such as formaldehyde, acetaldehyde, or butyraldehyde, and their polymerization products may be used. The higher alcohols of the aliphatic series and the various polyhydric alcohols and their ethers are also suitable for my purpose. The higher fatty acids containing more than eight carbon atoms may also be used. In this case, resinification occurs through the interaction of the amino group of the aromatic amine and the carboxyl group of the fatty acid, followed by polymerization of the compound so formed.

In order to illustrate specifically the new type of complex condensation product contemplated for use in accordance with the present invention, I have set forth below several examples of the type of product suitable for use. However, it is to be understood that I do not confine myself to the specific chemicals, or proportions thereof, set forth in these examples, as it will be readily apparent that equivalents of these specific chemicals and their substituted derivatives, and other proportions, may be employed without departing from the spirit of the invention or the scope of the appended claims. My broad idea contemplates the formation of condensation products similar to the well known synthetic resins and plastics formed by the condensation reactions between chemical bodies or groups of the character mentioned above, but differing from these insoluble resins in that they are highly colloidal and usually water-soluble as a result of the incorporation therein of organic residues by nuclear substitution and condensation reactions which form complex products of very high molecular weight possessing the desired colloidality and wetting properties.

The distinguishing structural characteristic of the following reaction products of an arylamine and one or more chemical individuals of the aliphatic series, is the presence of an amino group or its residue after having one or both of its hydrogen atoms replaced by acyl residues, or otherwise linked with alkyl residues or polymerized products thereof derived from members of the aliphatic series that are capable of undergoing resinifying reactions. In fact, compounds of this type may be regarded as acylated arylamines of the general formula

wherein R stands for a substituted or unsubstituted cyclic or polycyclic aryl group, and $R_1$ and $R_2$ represent alkyl or other aliphatic residues, or condensation products of these with aromatic hydrocarbons. Very effective compounds are prepared by having either $R_1$ or $R_2$ represent an alkyl group having not more than five carbon atoms, while the remaining position is occupied by a long straight chain aliphatic radical, or a condensed body of very high molecular weight which contains aliphatic alkyl groups as side chains. (See Examples 4 and 5 below.)

A further embodiment of the invention is to combine the resinous, acylated amino derivatives above described with primary or secondary alkyl amines and their hydroxylated derivatives to form long chain tertiary amine salts of very pronounced wetting properties. As a prerequisite for this, it is necessary that carboxyl and/or sulfonic groups be present in one or more of the R, $R_1$, $R_2$ positions to act as acylating agents for the alkyl amine. The alkyl amine already contains one or two alkyl or hydroxy alkyl groups containing not more than five carbon atoms each, and upon acylation with the complex resinoid body prepared as described by acylation and substitution of an arylamine, very efficient demulsifiers for petroleum emulsions are prepared. Compounds of this type contain two or more tertiary nitrogen atoms in their molecule, to which are attached the various organic groups above described.

*Example 1*

An aromatic amine, such as aniline oil, is first sulfonated and the resulting product reacted with a polyhydric alcohol. In the preferred practice of this embodiment of the invention, 300 parts of 98–100% sulfuric acid are run into a jacketed reaction kettle and 100 parts of aniline oil are cautiously added. The mixture, consisting of aniline sulfate with an excess of sulfuric acid, is heated to 180–200° C. by circulating heated oil or steam in the jacket, and maintained at this temperature until converted into water-soluble form. While still warm enough to prevent crystallization of the sulfonated material, the acid solution is slowly run into 200 parts of a polyhydric alcohol, preferably ethylene glycol or diethylene glycol while stirring constantly. A thick, viscous, soft resin is formed, the properties of which can be varied by the temperature at which the reaction occurs and the duration of the heating period. In preferred practice, the heating should be conducted at about 100° C. until a soft resin of maximum viscosity is obtained, which product is water-soluble.

*Example 2*

Sulfonated aniline is prepared and added to a polyhydric alcohol in the manner set forth in Example 1, after which from 10 to 50 parts of an aldehyde solution, such as a 40% formaldehyde solution, are added slowly while stirring constantly. A very viscous, soft resin is formed which is water-soluble. Care must be taken to avoid too prolonged heating and employing an excessive amount of formaldehyde since an insoluble resin may be formed in such cases.

Example 3

A sulfonated resin prepared as in Examples 1 or 2 is mixed with a molecular quantity of a higher fatty acid, such as oleic acid, and warmed to 50–100° C. for 2 hours. A complex, water insoluble, condensation product forms which is very sticky and viscous. Upon diluting with water and boiling, sulfuric acid is split off and the resinous upper layer is withdrawn and converted to its potassium or ammonium salt, or is heated with an aliphatic or alkylene amine to convert it to its corresponding amino derivative. The product so produced is very soluble in petroleum products, and forms highly colloidal water solutions.

Example 4

1 mol each of aniline oil, oleic acid, and acetaldol, are heated to 50° C., and 500 parts of 98% sulfuric acid are slowly and cautiously added while maintaining the temperature at 40–60° C. After all of the acid is in, the mass is heated at 80° C. for an hour, and finally at 100° C. for an hour or until a thick, oily, resin is formed which gives no test for free aniline or aldehyde. The mass is diluted with an equal volume of water, heated to boiling, and the upper layer that separates is withdrawn and converted into its potassium or ammonium salt, or into an amino derivative as described in Example 3.

Some of the products prepared in accordance with the examples set forth above are very active de-emulsifying agents for water-in-oil emulsions, and may be used as such. However, more complex condensation products may be prepared in several ways, as indicated below, and are preferred as treating agents. In particular, I have found it advantageous to employ as resolving agents the products formed by condensing any of the products described in the foregoing examples with aromatic sulfonic acids or their nuclear-substituted derivatives.

When such products are to be employed, I prepare a separate batch of a nuclear-substituted aromatic sulfonic acid, such as an alkyl, aryl, aryl-alkyl, or cyclo-alkyl aromatic sulfonic acid, according to any of the well known methods of preparing such chemical bodies, and condense one part of the soluble resins described above with from 1 to 10 parts of the substituted aromatic acid, the proportions of reacting materials employed varying with the type of resin treated. As the unwashed derivatives are usually used in these condensation reactions, they are often sufficiently acidic to condense upon warming and agitating but, if desired, sufficient oleum or chlorosulfonic acid may be added to complete the condensation. While the acid mass resulting from the treatment may be employed it is also possible, and sometimes advantageous, to employ an ester, salt, or amino derivative.

The following example is illustrative of this embodiment of the invention:

Example 5

100 parts of a water-soluble resin as prepared according to any of the above examples are condensed with 500 parts of butylnaphthalene sulfonic acid, prepared as follows:

100 parts of 98 per cent sulfuric acid are run into a jacketed reaction kettle and heated to a temperature of approximately 160° C. 500 parts of melted naphthalene are slowly run into the heated acid and the temperature is raised to approximately 180° C. and the mass maintained at such temperature for about two to three hours, or until the naphthalene has become intensively sulfonated, this possibly being brought about through the substitution of two or three sulfonic groups.

800 parts of 98 per cent sulfuric acid are slowly run into a coil-equipped reaction vessel containing 500 parts of normal butyl alcohol, the temperature being maintained below 85° C. The acid butyl sulfate so formed is then added to the naphthalene sulfonic acid, which previously has been cooled to about 100–125° C., over a period of two hours, and the heating is continued for an additional period of three hours, if necessary, to complete the alkylation.

The above product may also be prepared by mixing the alcohol with the naphthalene and slowly adding the sulfuric acid until alkylation is complete. Then the balance of the sulfuric acid is added, and the sulfonation is accomplished at elevated temperatures.

Instead of n-butyl alcohol, any of the other primary alcohols or a secondary alcohol, such as isopropanol, may be used.

500 parts of the resulting acid mass are then condensed at approximately 80° to 100° C. with 100 parts of the soft synthetic resin prepared according to Examples 1, 2, 3, or 4 to form a very complex condensation product of extremely high molecular weight which is unusually efficient as a treating reagent for petroleum emulsions.

The acid mass produced may be used as such or, as is sometimes found to be advantageous, it may be converted into its sodium, potassium, or ammonium salt, or into its ester by combination with alcohols.

Example 6

A complex condensation product such as that prepared in accordance with the preceding example may be further condensed with a suitable compound or grouping to provide a resulting water or oil soluble amino derivative. For example, the acid condensation product may be condensed with primary, secondary, or tertiary aliphatic amines or alkyl substituted aromatic amines which yield water or oil soluble derivatives. In preferred practice I employ an alkyl amine, particularly one which contains one or more hydroxylated aliphatic groups, such as mono-, di-, or tri-ethanolamine. Products of this type have been found to be unusually effective agents for resolving petroleum emulsions.

As a specific example of this embodiment of the invention, 500 parts of the acid condensation product prepared according to the method covered by Example 5, which may be freed from its excess of mineral acid by any well known method, are combined with 50 parts of diethanolamine.

The reaction between the acidic condensation product and an aromatic primary or secondary amine involves acylation of the amine through replacement of one or both of the hydrogen atoms of the amino group, $NH_2$. This is effected by heating the mixture at elevated temperatures.

In the case of an aliphatic amine, for instance a di-alkylamine, the reaction product may be simply the substituted ammonium salt of the type (1) 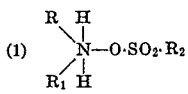

wherein R and $R_1$ represent alkyl groups, and $R_2$ is the radical attached to the sulfonic or carboxyl group. This is the ordinary neutralization reaction which does not involve any substitution of the hydrogens attached to the nitrogen. However, acylation of the amine by the acidic condensation product is also possible by heating the mass at elevated temperatures for some time. The substituted ammonium salt undergoes a re-arrangement and forms an acylated derivative of the amine while eliminating a molecule of water. This reaction takes place according to the following general scheme:

(2) $R.R_1.NH + R_2.X.OH = R.R_1.N.X.R_2 + H_2O$ wherein R is alkyl, $R_1$ is alkyl or H, $R_2$ is the radical attached to the sulfonic or carboxyl group, X.OH, of the acidic resinoid body, and N is the nitrogen atom.

The water solubility of the product is usually increased by condensing the acidic resinoid body with aliphatic amines or aromatic amines containing alkyl groups in the side-chain according to formula (1). On the other hand, products of the $R.R_1.N.X.R_2$ type indicated in reaction (2) are very soluble in petroleum products, and form colloidally hydrated aqueous solutions.

Where much larger than stoichiometrical proportions of the acidic condensation product are used, a third type of reaction involving esterification of the hydroxyl groups of the hydroxylated aliphatic amine also occurs. This may occur simultaneously with the acylation of the amino group, and thus provides a very complex condensation product which is a highly efficient demulsifier for petroleum emulsions. The reaction would then probably take place according to the following general scheme:

(3) 

Wherein $R_2$ is the radical attached to the sulfonic or carboxyl group, X.OH, of the acidic resinoid body employed as an acylating agent, and N is the nitrogen atom.

Such condensation products may be exemplified by the following type formula:

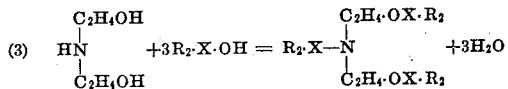

wherein $R_2.X$ is the resinoid radical attached to the nitrogen atom, N; and $A.OX.R_2$ is the ester produced by esterification of the hydroxyl groups of the alkyl radical, A.

It is obvious that many permutations and combinations of substances may be prepared from the various reactive bodies known to undergo resinification, and that only a few examples can be given in the specification. It is also obvious that two or more of the resins produced may be further condensed and then combined with a nuclear-substituted aromatic sulfonic acid, and that alkylation and sulfonation can often be conducted simultaneously with resinification in many cases.

Proportions of reacting substances, temperatures, time of heating, etc., are specified in some of the preceding examples while more general directions only are given in others. Obviously, many permutations and combinations in proportions of reacting bodies are made possible by varying the time of heating and/or the temperatures used. For example, if molecular proportions of a polyhydric alcohol and an aldehyde, or an aromatic amino sulfonic body and an aldehyde, are heated at a certain temperature for $n$ minutes to form a water-soluble condensation product, it is obvious that if only one-half mol of aldehyde is used, the heating must be extended or the temperature raised, or both, to obtain a condensation product of the same physical characteristics. Conversely, if two mols of aldehyde are used either the temperature must be reduced or the time of heating shortened, or both, to prevent the condensation from proceeding to the point where insoluble resins are obtained. The properties of the particular aldehydes, alcohols, fatty acids, etc., used will likewise influence the procedure employed in the preparation of these soluble resinous bodies as will also the nature of the organic residues present in substituted derivatives of the various polyhydric alcohols, aldehydes, amines, etc. These various considerations, however, are within the knowledge and practices of the trained organic chemist and will be readily understood by those skilled in the art.

Where reference is made in the appended claims to "carboxyl and sulfonic groups" it is to be understood that this refers to the presence of COOH and $SO_2.OH$ groups respectively, and also to the products formed when they are neutralized by a metallic base, ammonia, or organic amine. Equivalents of these groups are also contemplated.

The term "water-soluble" is used to include the property of forming colloidally hydrated aqueous solution.

The improved treating agents prepared in accordance with the present invention are used in the proportion of one part of treating agent to from 2,000 to 20,000 parts of petroleum emulsion, either by adding the concentrated product directly to the emulsion or after diluting with water or oil in the conventional manner. The treating agents may be used in any of the numerous ways commonly employed in the treatment of petroleum emulsions as will be apparent.

I do not make any claim to the simpler condensation products of the substituted sulfonic acids such as those produced by treating the latter with aldehydes, polyhydric alcohols, and fatty acids, such as those claimed by other inventors, as many of these involve only the linking of two cyclic or polycyclic groups by means of an aldehyde bridge or a similar condensation reaction.

I claim:

1. The process of resolving water-in-oil emulsions which comprises adding thereto a complex condensation product of the modified synthetic resin type prepared from a sulfonated aromatic amine and one or more aliphatic bodies containing resinophore groups.

2. The process of resolving water-in-oil emulsions which comprises adding thereto a complex condensation product of the modified synthetic resin type prepared from a sulfonated aromatic amine and a polyhydric alcohol of the aliphatic series.

3. The process of resolving water-in-oil emulsions which comprises adding thereto a complex condensation product of the modified synthetic resin type prepared from a sulfonated aromatic amine and an aldehyde of the aliphatic series.

4. The process of resolving water-in-oil emulsions which comprises adding thereto a complex condensation product of the modified synthetic resin type prepared from a sulfonated aromatic amine, a polyhydric alcohol, and an aldehyde of the aliphatic series.

5. The process of resolving water-in-oil emulsions which comprises adding thereto a complex condensation product of the modified synthetic resin type prepared from a sulfonated aromatic amine, a polyhydric alcohol, an aldehyde of the aliphatic series, and a fatty acid having more than eight carbon atoms.

6. The process of resolving water-in-oil emulsions which comprises adding thereto a complex condensation product of the modified synthetic resin type prepared from a sulfonated aromatic amine, one or more aliphatic bodies containing resinophore groups, and a nuclear-substituted aromatic sulfonic acid.

7. The process of resolving water-in-oil emulsions which comprises adding thereto a complex condensation product of the modified synthetic resin type prepared from a sulfonated aromatic amine, a polyhydric alcohol of the aliphatic series, and a nuclear-substituted aromatic sulfonic acid.

8. The process of resolving water-in-oil emulsions which comprises adding thereto a complex condensation product of the modified synthetic resin type prepared from a sulfonated aromatic amine, an aldehyde of the aliphatic series, and a nuclear-substituted aromatic sulfonic acid.

9. The process of resolving water-in-oil emulsions which comprises adding thereto a complex condensation product of the modified synthetic resin type prepared from a sulfonated aromatic amine, a polyhydric alcohol, an aldehyde of the aliphatic series, and a nuclear-substituted aromatic sulfonic acid.

10. The process of resolving water-in-oil emulsions which comprises adding thereto a complex condensation product of the modified synthetic resin type prepared from a sulfonated aromatic amine, a polyhydric alcohol, an aldehyde of the aliphatic series, a fatty acid having more than eight carbon atoms, and a nuclear-substituted aromatic sulfonic acid.

11. The process of resolving water-in-oil emulsions which comprises adding thereto a treating agent comprising a water-soluble derivative of the condensation product of a sulfonated aromatic amine, a polyhydric alcohol, and an aromatic compound selected from the group comprising aromatic sulfonic acids and nuclear-substituted derivatives thereof, said water-soluble derivatives being a salt, ester, or amino derivative thereof.

12. The process of resolving water-in-oil emulsions which comprises adding thereto a treating agent comprising a complex condensation product of a sulfonated aromatic amine, a polyhydric alcohol, an aldehyde, and an aromatic compound selected from the group comprising aromatic sulfonic acids and nuclear-substituted derivatives thereof.

13. The process of resolving water-in-oil emulsions which comprises adding thereto a treating agent comprising a water-soluble derivative of the condensation product of a sulfonated aromatic amine, a polyhydric alcohol, an aldehyde, and an aromatic compound selected from the group comprising aromatic sulfonated acids and nuclear-substituted derivatives thereof, said water-soluble derivative being a salt, ester, or amino derivative thereof.

14. The process of resolving water-in-oil emulsions which comprises adding thereto a treating agent comprising a complex condensation product of a sulfonated aromatic amine, a polyhydric alcohol, an aldehyde, a nuclear-substituted aromatic sulfonic acid, and an alkylamine containing a hydroxylated aliphatic group.

15. The process of resolving water-in-oil emulsions which comprises adding thereto a treating agent comprising a water-soluble derivative of the condensation product of a sulfonated aromatic amine, a polyhydric alcohol, a compound selected from the group consisting of aldehydes and aldols, a fatty acid having more than eight carbon atoms, and an aromatic compound selected from the group comprising aromatic sulfonic acids and nuclear-substituted derivatives thereof, said water-soluble derivative being a salt, ester, or amino derivative.

16. The process of resolving water-in-oil emulsions which comprises adding thereto a treating agent comprising a complex condensation product of a sulfonated aromatic amine, a polyhydric alcohol, an aldehyde, a fatty acid having more than eight carbon atoms, a nuclear-substituted aromatic sulfonic acid, and an alkylamine containing a hydroxylated aliphatic group.

17. The process of resolving water-in-oil emulsions which comprises adding thereto an acylated non-hydroxy amine of the general type

wherein the radicals R, R₁, and R₂ are selected from the group consisting of substituted and unsubstituted aryl groups, non-hydroxy alkyl groups, and residues from aliphatic acids containing more than eight carbon atoms, and condensation products of these with aromatic hydrocarbons.

18. The process of resolving water-in-oil emulsions which comprises adding thereto the condensation product of a non-hydroxy alkylamine and a resinoid body comprising an acylated amine of the general type

wherein the radicals R, R₁, and R₂ are selected from the group consisting of substituted and unsubstituted aryl groups, non-hydroxy alkyl groups, and residues from aliphatic acids containing more than eight carbon atoms, and condensation products of these with aromatic hydrocarbons.

19. The process of resolving petroleum emulsions which comprises adding thereto a treating agent comprising a water-soluble substituted ammonium salt of the general type R·R₁·HN·X·OH·R₂ wherein R is alkyl, R₁ is alkyl or hydrogen, NH is an imino group, X·OH is a carboxyl or sulfo group, and R₂ is a complex resinoid body, said resinoid body being characterized by the presence of an amino group or its residue linked with residues from members of the aliphatic series.

20. The process of resolving petroleum emulsions which comprises adding thereto a treating agent comprising an oil soluble substituted amine of the general type R·R₁·N·X·R₂, wherein R is alkyl, R₁ is alkyl or hydrogen, N is a nitrogen atom, X is a residue from a sulfo or carboxyl group, and R₂ is a complex resinoid body, said resinoid body being characterized by the presence of an amino group or its residue linked with residues from members of the aliphatic series.

21. The process of resolving petroleum emulsions which comprises adding thereto a treating agent comprising a substituted amine of the general type

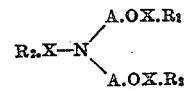

wherein A·OX·R₂ is the ester radical produced by esterification of the hydroxyl groups of the alkyl radical or radicals A, N is a nitrogen atom, and R₂·X is the residue from the complex resinoid body R₂·X·OH, said resinoid body being characterized by the presence of an amino group or its residue linked with residues from one or more members of the aliphatic series.

TRUMAN B. WAYNE.